United States Patent
Lehr et al.

(10) Patent No.: US 8,577,890 B2
(45) Date of Patent: Nov. 5, 2013

(54) MODIFYING DATA SET NAME QUALIFIERS

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 12/361,530

(22) Filed: Jan. 28, 2009

(65) Prior Publication Data

US 2010/0191738 A1    Jul. 29, 2010

(51) Int. Cl.
*G06F 7/00*    (2006.01)
(52) U.S. Cl.
USPC ............................................ 707/741; 707/803
(58) Field of Classification Search
USPC .................................................. 707/741, 803
See application file for complete search history.

(56) References Cited

U.S. PATENT DOCUMENTS

| | | | |
|---|---|---|---|
| 5,897,633 A * | 4/1999 | Nolan ................................ 1/1 |
| 6,460,048 B1 | 10/2002 | Teng et al. |
| 2004/0039842 A1 * | 2/2004 | Pilkington .................... 709/245 |
| 2004/0181670 A1 * | 9/2004 | Thune et al. .................. 713/176 |
| 2005/0187990 A1 * | 8/2005 | Pace et al. ..................... 707/204 |
| 2005/0216320 A1 * | 9/2005 | Hattaway ......................... 705/7 |
| 2006/0106824 A1 * | 5/2006 | Stuhec .......................... 707/100 |
| 2007/0050269 A1 | 3/2007 | Choi et al. |
| 2007/0088769 A1 | 4/2007 | Pace et al. |
| 2007/0118354 A1 * | 5/2007 | Stuhec ............................. 704/9 |
| 2008/0172556 A1 * | 7/2008 | Ishikawa et al. ................ 713/2 |
| 2010/0199058 A1 * | 8/2010 | Szowa et al. .................. 711/171 |

* cited by examiner

*Primary Examiner* — Pierre Vital
*Assistant Examiner* — Christopher J Raab
(74) *Attorney, Agent, or Firm* — Kunzler Law Group

(57) ABSTRACT

An apparatus, system, and method are disclosed for modifying data set names. A communication module receives a data set name as an index of a catalog entry for a catalog. The data set name comprises at least two qualifiers. A modification module modifies at least one data set name qualifier using a naming algorithm, wherein an alias qualifier is not modified. A store module stores the catalog entry indexed with the modified data set name in order to optimize the location of that entry within the catalog.

15 Claims, 7 Drawing Sheets

MODIFYING DATA SET NAME QUALIFIERS

BACKGROUND

1. Field

This invention relates to data set names and more particularly relates to modifying data set names.

2. Description of the Related Art

Data sets are typically stored in storage devices such as hard disk drives, optical storage devices, and the like. A data set may include a file, a data structure, a database, and/or the like. A catalog may store information regarding each data set. For example, the catalog may store a location, a creation date, a modified date, and a size for the data set.

The data set information may be stored in a catalog entry. Catalog entries are often indexed with one or more names of the data sets that the catalog entries reference. Thus, the data set's name is used to access the data set's catalog entry. The catalog entry may then be used to access the data set.

The catalog may be stored in a memory of a computer. Alternatively, the catalog may be stored on an external storage device. For example, the catalog for a storage subsystem may be stored on one or more logical volumes comprising one or more physical storage devices.

A plurality of extents may be allocated to store the catalog. In addition, the catalog may be organized so that catalog entries occupy the extents in a sequential order keyed to an index such as the data set name. Such a catalog may be optimized for random indexes. Unfortunately, repeatedly saving the information regarding the data set in such a catalog may cause unintended growth in a size of the catalog.

SUMMARY

From the foregoing discussion, there is a need for an apparatus, system, and method that modify data set names. Beneficially, such an apparatus, system, and method would automatically modify data set names to prevent unintended growth in a size of a catalog that stores information regarding each data set.

The present invention has been developed in response to the present state of the art, and in particular, in response to the problems and needs in the art that have not yet been fully solved by currently available apparatus, systems and methods for modifying data set names. Accordingly, the present invention has been developed to provide an apparatus, system, and method for modifying data set names that overcome many or all of the above discussed shortcomings in the art.

The apparatus to modify data set names is provided with a plurality of modules configured to functionally execute the steps of receiving a data set name, modifying at least one data set name qualifier, and storing a catalog entry. These modules in the described embodiments include a communication module, a modification module, and a store module.

The communication module receives a data set name as an index of a catalog entry for a catalog. The data set name comprises at least two qualifiers. The modification module modifies at least one data set name qualifier using a naming algorithm, wherein an alias qualifier is not modified. The store module stores the catalog entry indexed with the modified data set name.

A system of the present invention is also presented to modify data set names. The system may be embodied in a data storage system (DSS). In particular, the system, in one embodiment, includes a plurality of storage devices and a computer.

The plurality of storage devices store data sets. The computer stores a catalog of the data sets stored on the plurality of storage devices. The computer comprises a communication module, a modification module, and a store module.

The communication module receives a data set name as an index of a catalog entry for the catalog. The data set name comprises at least two qualifiers. Each qualifier comprises an alphanumeric string separated from other qualifiers by a delimiter.

The modification module modifies at least one data set name qualifier using a naming algorithm, wherein an alias qualifier is not modified. The store module stores the catalog entry indexed with the modified data set name in the catalog.

A method of the present invention is also presented for modifying data set names. The method in the disclosed embodiments substantially includes the steps to carry out the functions presented above with respect to the operation of the described apparatus and system. In one embodiment, the method includes receiving a data set name, modifying at least one data set name qualifier, and storing a catalog entry.

A communication module receives a data set name as an index of a catalog entry for a catalog. The data set name comprises at least two qualifiers. A modification module modifies at least one data set name qualifier using a naming algorithm, wherein an alias qualifier is not modified. A store module stores the catalog entry indexed with the modified data set name.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention automates modifying data set names. Beneficially, such an apparatus, system, and method would modify data set names to prevent unintended growth in a size of a catalog that stores information regarding each data set. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium may comprise computer readable code stored on a tangible storage device that performs a function when executed by hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
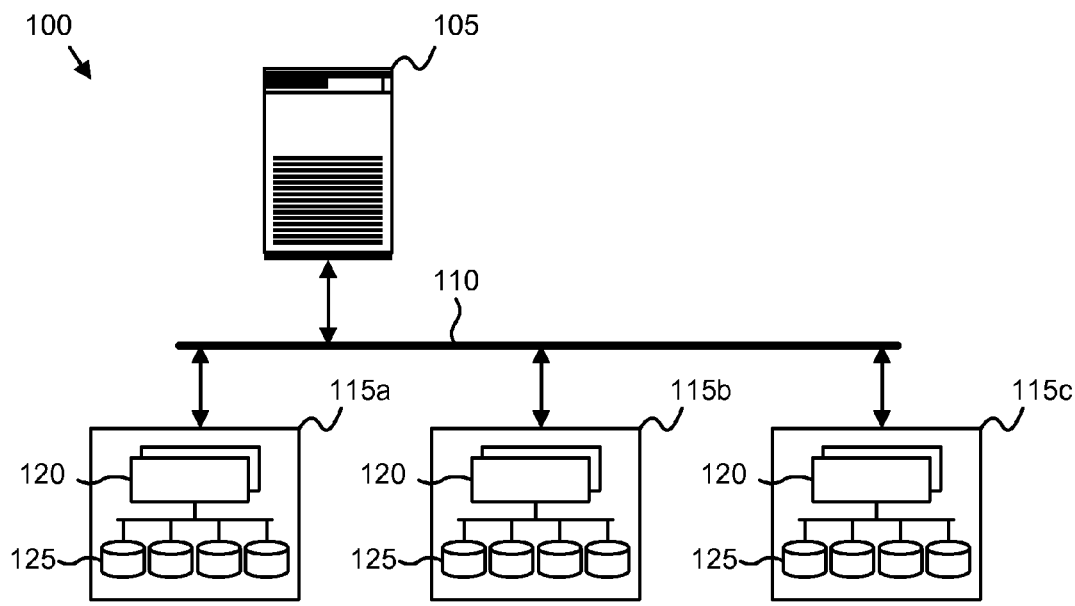
FIG. 1 is a schematic block diagram illustrating one embodiment of a data storage system (DSS) in accordance with the present invention.

FIG. 1 is a schematic block diagram illustrating one embodiment of a data storage system (DSS) 100 in accordance with the present invention. The DSS 100 includes a computer 105, a network 110, and one or more storage subsystems 115. Although, for simplicity, the DSS 100 is shown with one computer 105, one network 110, and three (3) storage subsystems 115, any number of computers 105, networks 110, and storage subsystems 115 may be employed.

Each storage subsystem 115 is further shown including a plurality of storage controllers 120 and a plurality of storage devices 125. The DSS 100 may be a Hydra cluster manufactured by International Business Machines Corporation (IBM) of Armonk, N.Y.

The storage devices 125 may include one or more hard disk drives, optical storage devices, magnetic tape drives, micro-mechanical storage devices, holographic storage devices, semiconductor storage devices, and/or the like. Alternatively, the storage device 125 may be configured as a just a bunch of disks (JBOD), a redundant array of independent disks (RAID), a tape library, a tape backup, a tape library, a compact disk read only memory (CD ROM) library, and/or the like.

In one embodiment, the DSS 100 provides data storage and data manipulation services for one or more clients or hosts. For example, a client may access data stored on a storage device 125 of a storage subsystem 115 by communicating a request through the network 110 to a storage controller 120 for the storage device 125. The storage controller 120 may retrieve the data from the storage device 125 and communicate the data to the client.

The network 110 may establish communication between the host and one or more storage subsystems 115. The network 110 may be selected from a local area network (LAN), a wide area network (WAN), the Internet, an Ethernet network, a token ring network, or the like. The network 110 may comprise one or more nodes that may provide one or more physical and/or logical paths for transferring the data. The communication over the network 110 may be through cables, wires, wireless, or the like as is well known to those of skill in the art.

The plurality of storage devices 125 store data sets. A file, a data structure, a database, and the like are referred to herein as the data set. The computer 105 stores a catalog of the plurality of data sets stored on the plurality of storage devices 125. In an embodiment, the computer 105 stores the catalog of the plurality of data sets stored on the plurality of storage devices 125 using the Internal Catalog Facility (ICF) produced by IBM. The computer 105 may manage the DSS 100. In an embodiment, the computer 105 operates under the Z/OS® operating system (OS) produced by IBM. In addition, the storage devices 125 may be organized as one or more logical volumes using a Z/OS® ICF as will be described hereafter.

Figure 2:
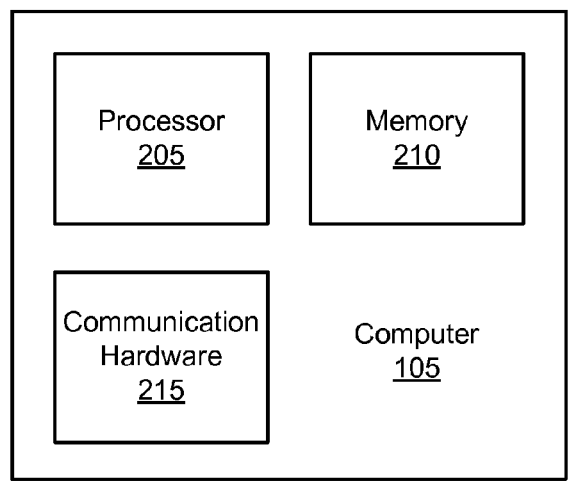
FIG. 2 is a schematic block diagram illustrating one embodiment of computer of the present invention.

FIG. 2 is a schematic block diagram illustrating one embodiment of computer 105 of the present invention. The computer 105 of FIG. 2 may be the computer 105 of FIG. 1. The description of the computer 105 refers to elements of FIG. 1, like numbers referring to like elements. The computer includes a processor 205, a memory 210, and communication hardware 215. Although, for simplicity, one processor 205, one memory 210, and one communication hardware 215 are shown with the computer 105, any number of processors 205, memories 210, and communication hardware 215 may be employed.

The memory 210 may store one or more computer readable programs. Each computer readable program may include executable code and data. The memory 210 may be a semiconductor device such as a Dynamic Random Access Memory (DRAM). Alternatively, the memory 210 may be flash memory, a micromechanical memory, and optical memory, holographic memory, a hard disk drive, or the like. One of skill in the art will recognize that the memory 210 may be any type of tangible storage device.

The processor 205 may retrieve one or more computer readable programs from the memory 210. In addition, the processor 205 may process the computer readable programs as is well known to those of skill in the art.

The communication hardware 215 may communicate with one or more external devices. For example, the computer 105 may communicate with the network 110 through the communication hardware 215. The communication hardware 215 may comprise an Ethernet interface, a Fibre Channel interface, or the like.

Figure 3:
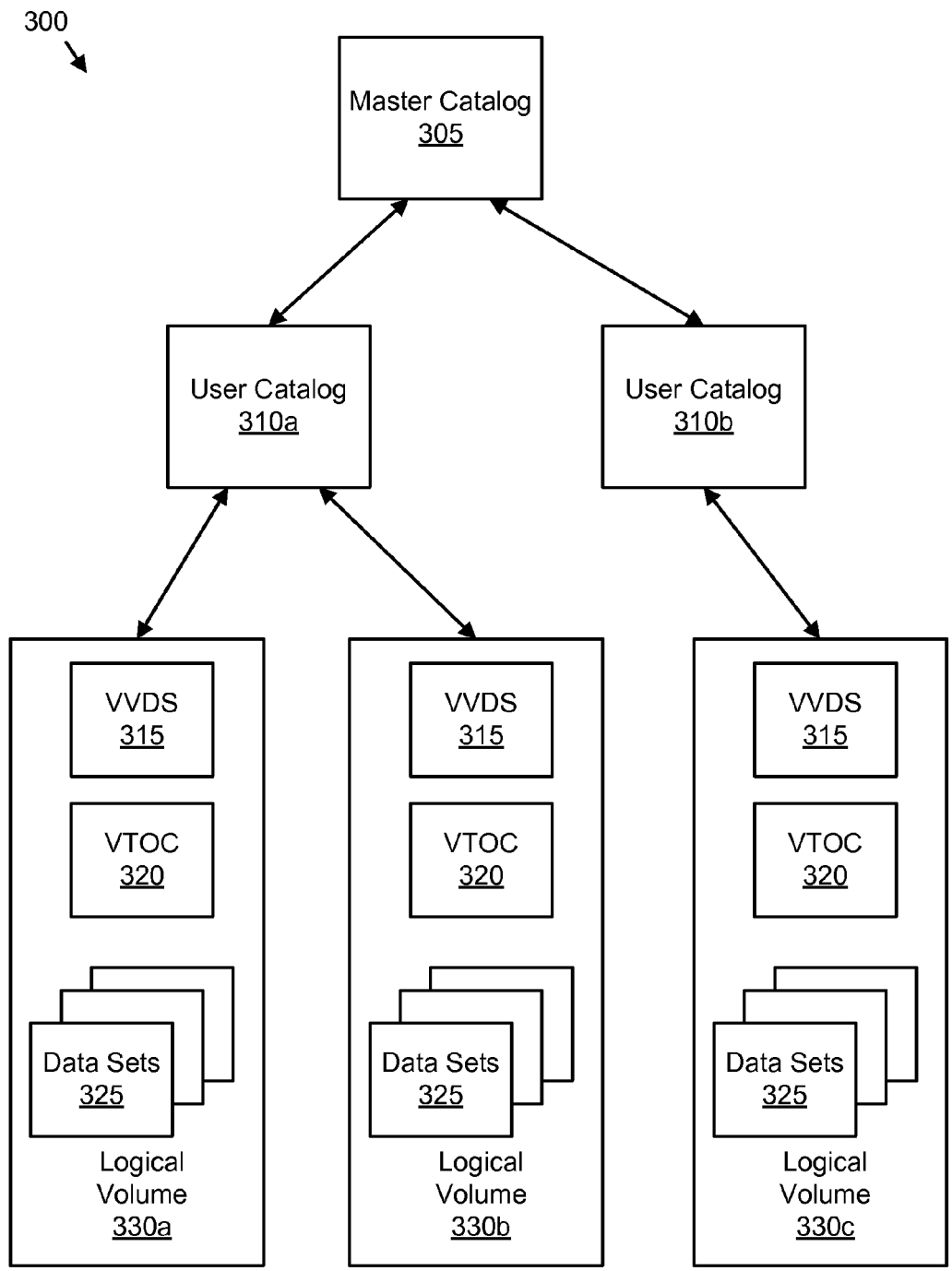
FIG. 3 is a schematic block diagram illustrating one embodiment of a Z/OS® Internal Catalog Facility (ICF) of the present invention.

FIG. 3 is a schematic block diagram illustrating one embodiment of a Z/OS® ICF 300 of the present invention. The description of the ICF 300 refers to elements of FIGS. 1-2, like numbers referring to like elements. The ICF 300 includes a master catalog 305, one or more user catalogs 310, and one or more logical volumes 330. Although, for simplicity, two (2) user catalogs 310a-b and three (3) logical volumes 330a-c are shown within the ICF 300, any number of user catalogs 310 and logical volumes 330 may be employed.

The ICF 300 may comprise a computer readable program stored on the memory 210 executed by the processor 205. In addition, the ICF 300 may also comprise one or more data structures stored on the storage devices 125 and/or in the memory 210. The ICF 300 may support locating a data set 325, without knowledge of the directory structures or paths of the ICF 300 as is well known to those of skill in the art.

The master catalog 305 may be created during a system generation process and reside on a system residence volume as is well known to those of skill in the art. The master catalog 305 may contain one or more system data set location entries and data set entries for Initial Program Load (IPL). In addition, the master catalog 305 may reference the user catalogs 310 using one or more aliases that are related to the user catalogs 310.

Each user catalog 310 may be created to contain a plurality of catalog entries. Each catalog entry may be specific for a specific dataset 325. In an embodiment, the catalog 310 is a Z/OS® catalog organized with catalog entries for Virtual Storage Access Method (VSAM) Key Sequence Data Sets (KSDS).

The VKSDS may comprise a catalog entry, a data component and an index component as is well known to those of skill in the art. The catalog entry may be stored in the master catalog 305 or the user catalog 310. The data component and the index component may be stored on separate logical volumes 330. The KSDS may have more than one index component. For example, a secondary key may be provided by an alternate index or a key value configured as an alias.

In a particular example, each VSAM KSDS may include a specific key value embedded in each data set name that may uniquely identify the specific data set from all other data sets. The key value may comprise a sequence of characters. The VSAM KSDS may be identified for access by specifying the specific key value embedded in that particular data set. The user catalog 310 may reference one or more data set entries using one or more aliases that are related to that particular data set 325 for accessing the data set 325.

In an embodiment, the user catalogs 310 are application specific. The user catalogs 310 may associate one or more data sets 325 with one or more logical volumes 330. Each logical volume 330 may comprise portions of one or more storage devices 125. In addition, each logical volume 330 may store one or more data sets 325. Each data set 325 may be stored and maintained using ICF protocols including system managed storage (SMS) and/or VSAM. Each logical volume 330 may further include a VSAM Volume Data Set (VVDS) 315 and a Volume Table of Contents (VTOC) 320.

The VTOC 320 may store information of a physical address of each data set 325. For example, the VTOC 320 may record a physical address, record length, and block size of the data set 325 stored on the storage devices 125. The user catalog 310 may reference the VTOC 320 to determine the physical location of the data set 325 in the logical volume 330.

The VVDS 315 may store additional information that is used to open and process the data sets 325. For example, the VVDS 315 may store a data set size.

The data set 325 may be accessed using a data set name. Under ICF 300, each data set name may be unique. The data set name comprises at least two qualifiers. Each qualifier may comprise an alphanumeric string separated from other qualifiers by a delimiter. Each qualifier may include one to eight (1-8) alphanumeric characters to form the alphanumeric string. In an embodiment, an initial qualifier, a first qualifier, a high-level qualifier, or the like of the data set name begins with an alphabetic character. For example, the data set name may be configured as "customer.job.library1" that comprises three (3) qualifiers. The qualifier "customer" may be the initial or alias qualifier.

Figure 4:
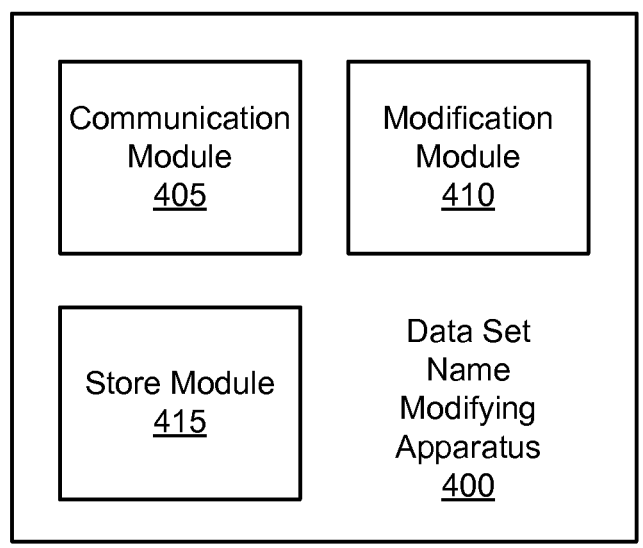
FIG. 4 is a schematic block diagram illustrating one embodiment of a data set name modifying apparatus of the present invention.

FIG. 4 is a schematic block diagram illustrating one embodiment of a data set name modifying apparatus 400 of the present invention. The apparatus 400 may be embodied in the computer 105 of FIGS. 1-2. The apparatus 400 automatically modifies data set names. The description of apparatus 400 refers to elements of FIGS. 1-3, like numbers referring to like elements. The apparatus 400 includes a communication module 405, a modification module 410, and a store module 415.

The communication module 405 receives a data set name as an index of a catalog entry for a catalog 305/310. The catalog 305/310 may be the master catalog 305 and/or the user catalog 310 of FIG. 3. Each catalog entry may include information such as a physical location, a creation date, a modified date, a size, and the like for a data set 325. In addition, each catalog entry may be indexed with a corresponding or specific data set name that an application may always refer to access the data set 325. For example, the data the set name may be used to access the data set's catalog entry. The catalog entry may then be used to access the data set 325. The communication module 415 may further present the data set name as the index of the catalog entry.

The communication module 405 may include a computer readable program stored on a tangible storage device. The computer readable program is executed on the computer 105. In one embodiment, the computer readable program is stored on the memory 210 and executed by the processor 205.

The modification module 410 modifies at least one data set name qualifier using a naming algorithm, wherein an alias qualifier is not modified. In an embodiment, the alias qualifier is the initial qualifier. For example, the first qualifier, the initial qualifier, or the high level qualifier of the data set name may not be modified.

The naming algorithm may transpose at least two alphanumeric characters within a specified qualifier to form the modified data set name. Alternatively, the naming algorithm may transpose at least two qualifiers of the data set name to form the modified data set name.

In one more embodiment, the naming algorithm generates an additional qualifier and appends the additional qualifier to the data set name to form the modified data set name. The additional qualifier may be selected to associate the catalog entry with a free extent of a plurality of extents storing the catalog. And extent may be a logical unit of storage space assigned to the catalog. The modification module 410 may further alter the modified data set name with a reverse naming algorithm to generate the data set name.

The modification module 410 may include a computer readable program stored on a tangible storage device. The computer readable program is executed on the computer 105. In one embodiment, the computer readable program is stored on the memory 210 and executed by the processor 205.

The store module 415 stores the catalog entry indexed with the modified data set name. For example, the store module 415 may store the catalog entry indexed with the modified data set name in the master catalog 305 or the user catalog 310. The store module 415 may include a computer readable program stored on a tangible storage device. The computer readable program is executed on the computer 105. In one embodiment, the computer readable program is stored on a memory 210 and executed by the processor 205.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
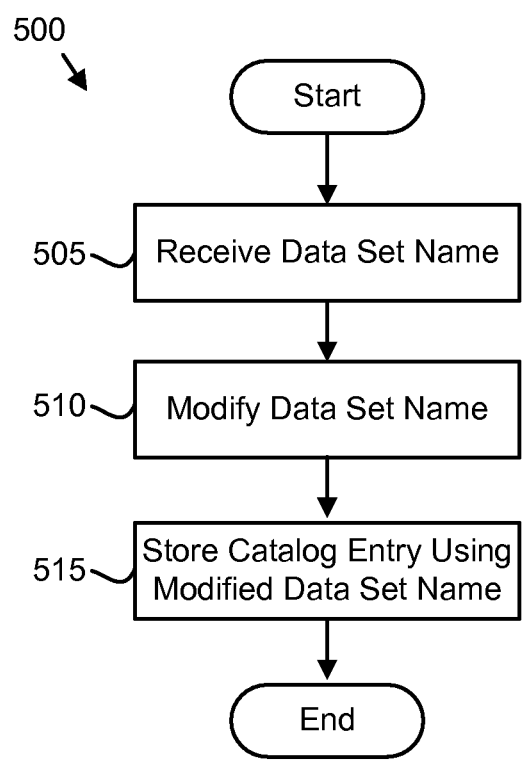
FIG. 5 is a schematic flow chart diagram illustrating one embodiment of a method for storing a catalog entry using a modified data set name of the present invention.

FIG. 5 is a schematic flow chart diagram illustrating one embodiment of a method 500 for storing a catalog entry using a modified data set name of the present invention. The method 500 substantially includes the steps to carry out the functions presented above with respect to the operation of the described apparatus 400 and DSS 100. The description of the method 500 refers to elements of FIGS. 1-4, like numbers referring to the like elements. In one embodiment, the method 500 is implemented with a computer readable storage medium comprising a computer readable program stored on a tangible storage device. The computer readable program may be executed by the processor 205 of the computer 105.

The method 500 begins, and in an embodiment, the communication module 405 receives 505 the data set name as the index of the catalog entry for the catalog 305/310. The catalog may be the master catalog 305 and/or the user catalog 310 of FIG. 3. The data set name comprises at least two qualifiers. For example, when the user issues a search command while inputting the data set name "customer.job.library1," the communication module 405 may automatically receive 505 the data set name "customer.job.library1" as the index of the catalog entry for the catalog 305/310.

The modification module 410 modifies 510 at least one data set name qualifier using the naming algorithm, wherein the alias qualifier is not modified. The naming algorithm may transpose one or more alphanumeric characters within a specified qualifier to form the modified data set name. The specified qualifier may be any qualifier except the alias qualifier. For example, the modification module 410 may employ the naming algorithm that may transpose two or more alphanumeric characters within a specified qualifier to form the modified data set name as will be described hereafter.

Alternatively, the naming algorithm may transpose at least two qualifiers of the data set name to form the modified data set name. For example, the modification module 410 may employ the naming algorithm that may transpose at least two qualifiers of the data set name except the initial qualifier to form the modified data set name as will be described hereafter.

In one more embodiment, the naming algorithm generates an additional qualifier and appends the additional qualifier to the data set name to form the modified data set name. For example, the naming algorithm may generate an additional qualifier comprising alphanumeric string "book4" and further may append the additional qualifier to the data set name to form the modified data set name as will be described hereafter.

The additional qualifier may be selected to associate the catalog entry with a free extent of a plurality of extents storing the catalog. For example, the additional qualifier may be selected to associate the catalog entry with the free extent in a sequential order keyed to an index such as the modified data set name. The free extent may be located in a free contiguous area of storage subsystem 115 in the computer file system, reserved for storage of the catalog 305/310. In addition, the modification module 410 may automatically create a corresponding catalog entry indexed with the modified data set name.

The store module 415 stores 515 the catalog entry indexed with the modified data set name and the method 500 ends. For example, the store module 415 may automatically store 515 the catalog entry indexed with the modified data set name in the sequential order to the free extent that is associated with the catalog entry by the selected qualifier. Thus, the method 600 automates modifying data set names, and may prevent unintended growth in the size of the catalog 305/310 by associating the catalog entry indexed with the modified data set name with a free extent.

Figure 6:
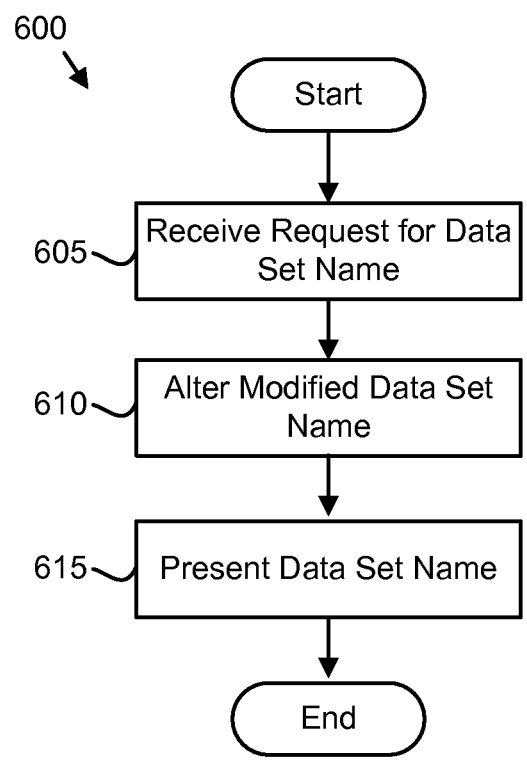
FIG. 6 is a schematic flow chart diagram illustrating one embodiment of a method for retrieving a data set with a modified data set name of the present invention.

FIG. 6 is a schematic flow chart diagram illustrating one embodiment of a method 600 for retrieving a data set 325 with a modified data set name of the present invention. The method 600 substantially includes the steps to carry out the functions presented above with respect to the operation of the described apparatus 400, method 500, and computer 105. The description of the method 600 refers to elements of FIGS. 1-5, like numbers referring to the like elements. In one embodiment, the method 600 is implemented with a computer readable storage medium comprising a computer readable program stored on a tangible storage device. The computer readable program may be executed by the processor 205 of the computer 105.

The method 600 begins, and in an embodiment, the communication module 405 receives 605 a request for a data set name. For example, when the user initiates a "listcat" command or an Interactive System Productivity Facility (ISPF) command to list the data set entries of the master catalog 305 or the user catalog 310, the communication module 405 may automatically receive 605 the request for the data set name.

The modification module 410 alters 610 the modified data set name with a reverse naming algorithm to generate the data set name. For example, the reverse naming algorithm may automatically alter 610 the modified data set name to generate the data set name. In a particular example, the reverse naming algorithm may reverse transpose at least two alphanumeric characters within the specified qualifier of the modified data set name to form the data set name. In another example, the reverse naming algorithm may reverse transpose the at least two qualifiers of the modified data set name to form the data set name.

The communication module 415 presents 615 the data set name as the index of the catalog entry and the method 600 ends. For example, the communication module 415 may present 615 the data set name as the index of the catalog entry and display each catalog entry on a display of the computer 105. Thus, the method 600 would present the data set entry as if indexed with the original data set name.

Figure 7:
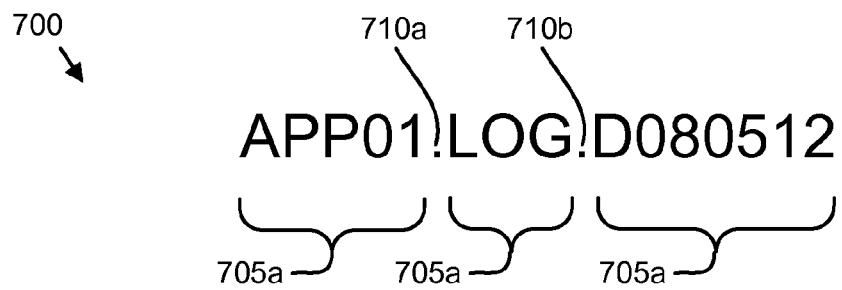
FIG. 7 is a word diagram illustrating one embodiment of a data set name of the present invention.

FIG. 7 is a schematic diagram illustrating one embodiment of a data set name 700 of the present invention. The data set name 700 may be for a data set 325 of FIG. 3 stored on the storage device 125. The data set name 700 includes a plurality of qualifiers 705a-c and a plurality of delimiters 710a-b. The description of the data set name 700 refers to elements of FIGS. 1-6, like numbers referring to the like elements. Although, for simplicity, the data set name 700 is shown with three (3) qualifiers 705a-c and two (2) delimiters 710a-b, any number of qualifiers 705 and delimiters 710 may be employed.

In the shown embodiment, the data set name 700 comprises an initial qualifier 705a, a second qualifier 705b, and a third qualifier 705c. The initial qualifier 705a, second qualifier 705b, and third qualifier 705c are shown comprising the alphanumeric strings "APP01," "LOG," and "D080512" respectively. In addition, a first delimiter 710a and a second delimiter 710b both configured as a dot (.) are shown separating the initial qualifier 705a from the second qualifier 705b and the second qualifier 705b from the third qualifier 705c respectively.

An application or user may input the data set name 700 while initiating a search for the data set 325. The communication module 405 may receive 505 the data set name 700 as the index of the catalog entry for the catalog 305/310. The catalog 305/310 may be the master catalog 305 and/or the user catalog 310 of FIG. 3.

Figure 8:
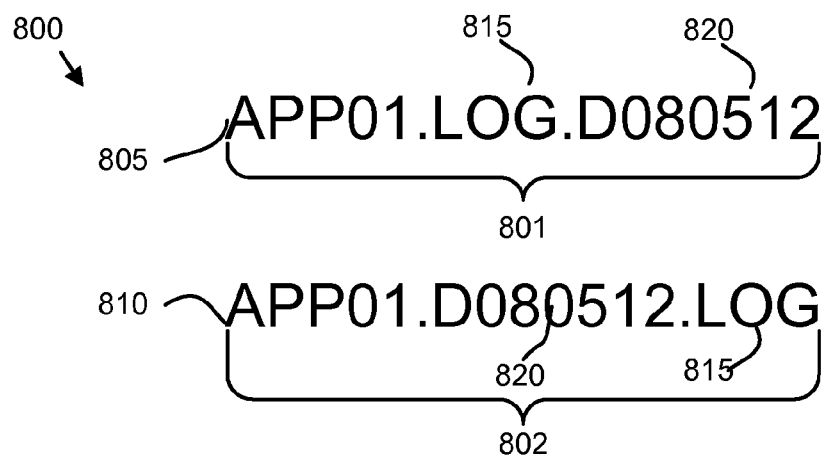
FIG. 8 is a word diagram illustrating one embodiment of a pair of an original data set name and a corresponding modified data set name of the present invention.

FIG. 8 is a schematic diagram illustrating one embodiment of a pair 800 of an original data set name 801 and a corresponding modified data set name 802 of the present invention. The description of the pair 800 refers to elements of FIGS. 1-7, like numbers referring to like elements.

In the shown embodiment, the original data set name 801 includes an initial qualifier 805 that comprises the alphanumeric string "APP01," a second qualifier 815 that comprises the alphanumeric string "LOG," and a third qualifier 820 that comprises the alphanumeric string "D080512." Further, each qualifier is shown separated from other qualifiers by the delimiter configured as the dot (.).

The modified data set name 801 is shown including an initial qualifier 810 that also comprises the alphanumeric string "APP01." The modification module 410 does not modify the initial qualifier 805. Thus, the initial qualifier 805 of the original data set name 801 and the initial qualifier 810 of the modified data set name 802 are shown comprising the same alphanumeric string.

In addition, the third qualifier 820 and the second qualifier 815 of the original data set name 801 are shown transposed with respect to each other in the modified data set name 802. The naming algorithm may transpose the second qualifier 815 and the third qualifier 820 of the original data set name 801 to form the modified data set name 802. Each qualifier is shown separated from other qualifiers by the delimiter configured as the dot (.) in the modified data set name 802.

The modification module 410 may automatically create the corresponding catalog entry indexed with the modified data set name 802. The store module 415 stores 515 the catalog entry indexed with the modified data set name 802.

The modification module 410 may further alter 610 the modified data set name 802 with the reverse naming algorithm to generate the original data set name 801. The communication module 405 may further present 615 the original data set name 801 as the index of the catalog entry.

Figure 9:
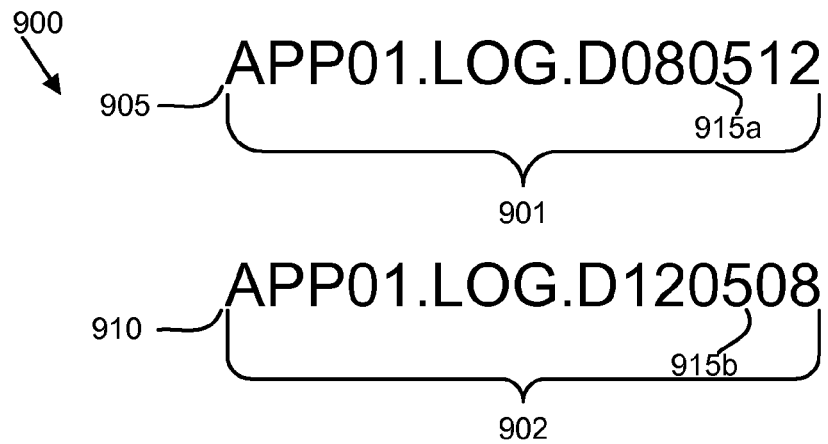
FIG. 9 is a word diagram illustrating one embodiment of another pair of an original data set name and a corresponding modified data set name of the present invention.

FIG. 9 is a schematic diagram illustrating one embodiment of another pair 900 of an original data set name 901 and a corresponding modified data set name 902 of the present invention. The description of the pair 900 refers to elements of FIGS. 1-8, like numbers referring to like elements.

In the shown embodiment, the original data set name 901 includes an initial qualifier 905 that comprises the alphanumeric string "APP01" and a third qualifier 915a that comprises the alphanumeric string "D080512." Further, each qualifier is shown separated from other qualifiers by the delimiter configured as the dot (.).

The modified data set name 902 is shown including an initial qualifier 910 that also comprises the alphanumeric string "APP01." The modification module 410 may not modify the initial qualifier 905. Thus, the initial qualifier 905 of the original data set name 901 and the initial qualifier 910 of the modified data set name 902 are shown comprising the same alphanumeric string.

A third qualifier 915b of the modified data set name 902 is shown comprising the alphanumeric string "D120508." The naming algorithm may transpose the alphanumeric characters within the third qualifier 915a of the original data set 901 to form the modified data set name 902 configured with the third qualifier 915b that comprises a transposed alphanumeric string "D120508." Each qualifier is further shown separated from other qualifiers by the delimiter configured as the dot (.) in the modified data set name 902.

The modification module 410 may automatically create the corresponding catalog entry indexed with the modified data set name 802. The store module 415 stores 515 the catalog entry indexed with the modified data set name 802.

The modification module 410 may further alter 610 the modified data set name 902 with the reverse naming algorithm to generate the original data set name 901 on receiving 605 the request for the original data set name 901. The communication module 405 may further present 615 the original data set name 901 as the index of the catalog entry.

Figure 10:
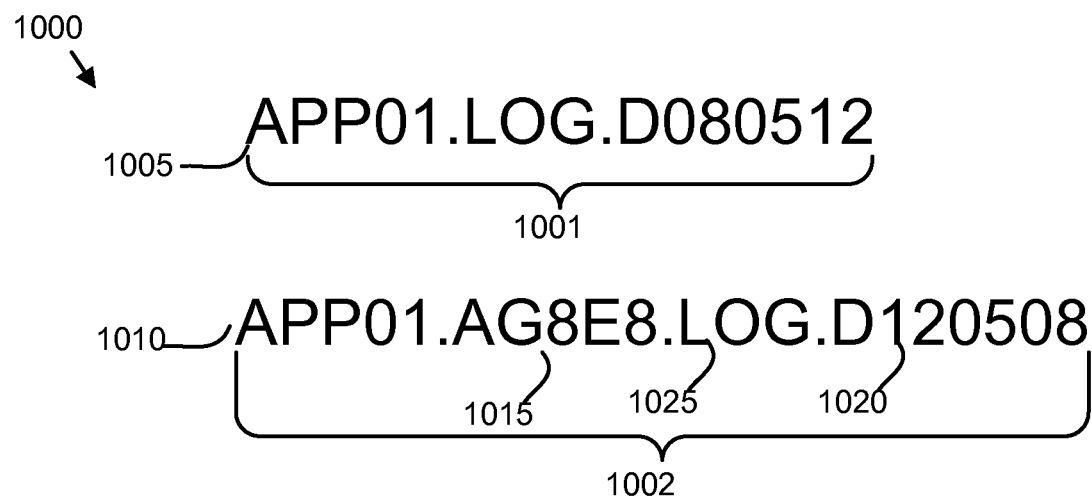
FIG. 10 is a word diagram illustrating embodiment of one more pair of an original data set name and a corresponding modified data set name of the present invention.

FIG. 10 is a schematic diagram illustrating one embodiment of one more pair 1000 of an original data set name 1001 and a corresponding modified data set name 1002 of the present invention. The description of the pair 1000 refers to elements of FIGS. 1-9, like numbers referring to like elements.

In the shown embodiment, the original data set name 1001 includes an initial qualifier 1005 that comprises the alphanumeric string "APP01." Further, each qualifier is shown separated from other qualifiers by the delimiter configured as the dot (.).

The modified data set name 1002 is shown including an initial qualifier 1010 that also comprises the alphanumeric string "APP01." The modification module 410 does not modify the initial qualifier 1005. Thus, the initial qualifier 1005 of the original data set name 1001 and the initial qualifier 1010 of the modified data set name 1002 are shown comprising the same alphanumeric string.

A third qualifier 1025 and a fourth qualifier 1020 of the modified data set name 902 are shown comprising the alphanumeric strings "LOG" and "D120508" respectively. Further, the modified data set name 1002 is shown including an additional qualifier configured as a second qualifier 1015 that comprises the alphanumeric string "AG8E8."

The naming algorithm may generate and append the additional qualifier configured as the second qualifier 1015 to the original data set name 1001 to form the modified data set name 1002. The additional qualifier configured as the second qualifier 1015 may be selected to associate the catalog entry with the free extent of a plurality of extents storing the catalog 305/310. Each qualifier is shown separated from other qualifiers by the delimiter configured as the dot (.) in the modified data set name 902.

The modification module 410 may automatically create the corresponding catalog entry indexed with the modified data set name 1002. The store module 415 stores 515 the catalog entry indexed with the modified data set name 1002.

The modification module 410 may further alter 610 the modified data set name 1002 with the reverse naming algorithm to generate the original data set name 1001 on receiving 605 the request for the original data set name 1001. The communication module 405 may further present 615 the original data set name 1001 as the index of the catalog entry.

The present invention automates modifying data set names. Beneficially, such an apparatus, system, and method would modify data set names to prevent unintended growth in a size of a catalog that stores information regarding each data set 325. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium comprising a computer readable program stored on a tangible storage device for modifying data set names, wherein the computer readable program when executed on a computer causes the computer to:

receive a data set name as an index of a catalog entry for a catalog, wherein the data set name comprises at least three qualifiers ordered as an initial qualifier, a second qualifier, and a third qualifier, each qualifier separated from adjacent qualifiers by a period, and the catalog is a Z/OS® catalog organized with Virtual Storage Access Method (VSAM) Key Sequence Data Sets (KSDS);

modify the data set name using a naming algorithm that transposes at least two alphanumeric characters within at least one qualifier and transposes the second qualifier and the third qualifier of the data set name to form a modified data set name, wherein an alias qualifier is not modified;

store the catalog entry indexed with the modified data set name ; and present the modified data set name as the index of the catalog entry.

2. The computer readable storage medium of claim 1, wherein the computer readable program further causes the computer to:

alter the modified data set name with a reverse naming algorithm to generate the data set name.

3. The computer readable storage medium of claim 1, wherein each qualifier comprises an alphanumeric string.

4. The computer readable storage medium of claim 1, wherein the naming algorithm further generates an additional qualifier and appends the additional qualifier to the data set name to form the modified data set name.

5. The computer readable storage medium of claim 4, wherein the additional qualifier is selected to associate the catalog entry with a free extent of a plurality of extents storing the catalog.

6. The computer readable storage medium of claim 1, wherein the alias qualifier is the initial qualifier.

7. An apparatus for modifying data set names, the apparatus comprising:

a computer readable storage medium storing computer readable program code executable by a processor, the compute readable program code comprising:

a communication module receiving a data set name as an index of a catalog entry for a catalog, wherein the data set name comprises at least three qualifiers ordered as an initial qualifier, a second qualifier, and a third qualifier, each qualifier separated from adjacent qualifiers by a period, and the catalog is a Z/OS® catalog organized with Virtual Storage Access Method (VSAM) Key Sequence Data Sets (KSDS);

a modification module modifying the data set name using a naming algorithm that transposes at least two alphanumeric characters within at least one qualifier and transposes the second qualifier and the third qualifier of the data set name to form a modified data set name, wherein an alias qualifier is not modified;

a store module storing the catalog entry indexed with the modified data set name; and the communication module further presenting the modified data set name as the index of the catalog entry.

8. The apparatus of claim 7, the modification module further altering the modified data set name with a reverse algorithm to generate the data set name.

9. The apparatus of claim 7, wherein each qualifier comprises an alphanumeric string.

10. The apparatus of claim 7, wherein the naming algorithm further appends an additional qualifier to the data set name to form the modified data set name.

11. A system for modifying data set names, the system comprising:

a plurality of storage devices storing data sets:

a computer storing a catalog of the data set stored on the plurality of storage devices and comprising:

a communication module receiving a data set name as an index of a catalog entry for a catalog, wherein the data set name comprises at least three qualifiers ordered as an initial qualifier, a second qualifier, and a third qualifier, each qualifier separated from adjacent qualifiers by a period, and the catalog is a Z/OS® catalog organized with Virtual Storage Access Method (VSAM) Key Sequence Data Sets (KSDS);

a modification module modifying the data set name using a naming algorithm that transposes at least two alphanumeric characters within at least one qualifier and transposes the second qualifier and the third qualifier of the data set name to form a modified data set name, wherein an alias qualifier is not modified;

a store module storing the catalog entry indexed with the modified data set name; and the communication module further presenting the modified data set name as the index of the catalog entry.

12. The system of claim 11, wherein the naming algorithm further generates an additional qualifier and appends the additional qualifier to the data set name to form the modified data set name.

13. The system of claim 12, wherein the additional qualifier is selected to associate the catalog entry with a free extent of a plurality of extents storing the catalog.

14. The system of claim 11, wherein the alias qualifier is the initial qualifier.

15. A method for deploying computer infrastructure, comprising integrating a computer readable program stored on a tangible storage device into a computing system, wherein the computer readable program executing on the computing system performs the following:

receiving a data set name as an index of a catalog entry for a catalog, wherein the data set name comprises at least three qualifiers ordered as an initial qualifier, a second qualifier, and a third qualifier, each qualifier comprising an alphanumeric string separated from other qualifiers by a period, and the catalog is a Z/OS® catalog organized with Virtual Storage Access Method(VSAM) Key Sequence Sets (KSDS);

modifying the data set name using a naming algorithm that transposes at least two alphanumeric characters within at least one qualifier and transposes the second qualifier and the third qualifier of the data set name to form a modified data set name, wherein an alias qualifier is not modified;

storing the catalog entry indexed with the modified data set name;

altering the modified data set name with a reverse naming algorithm to generate the data set name; and presenting the data set name as the index of the catalog entry.

\* \* \* \* \*